Oct. 6, 1964   C. H. BUNKER ETAL   3,151,510
WIRE STRIPPER
Filed Feb. 8, 1963   3 Sheets-Sheet 1

INVENTORS
CARLETON H. BUNKER.
JOHN J. JAMES

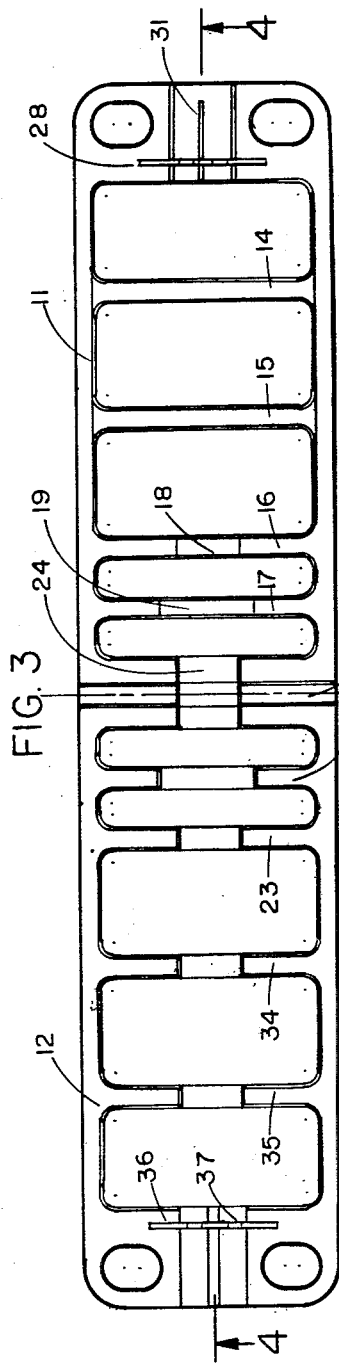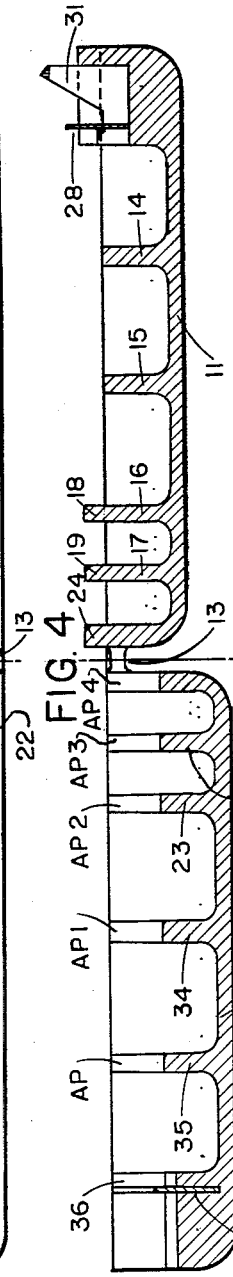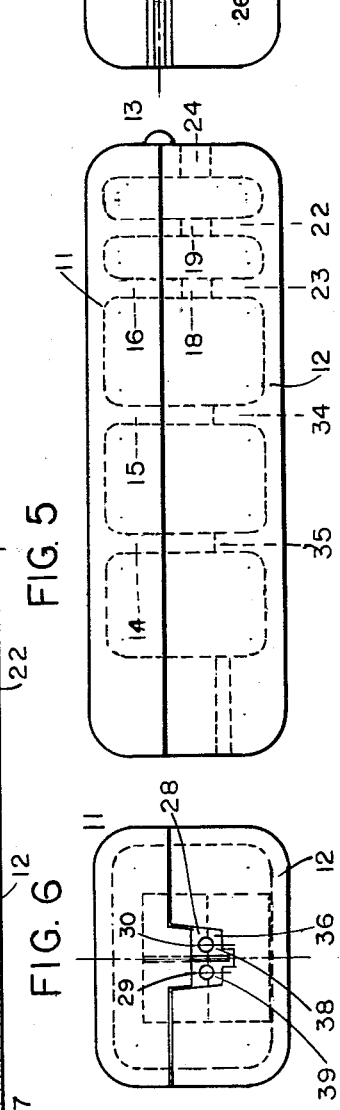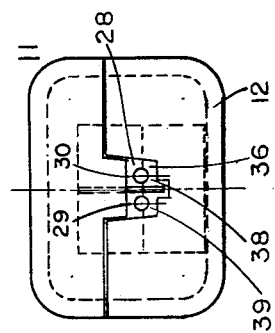
INVENTORS
CARLETON H. BUNKER.
JOHN J. JAMES

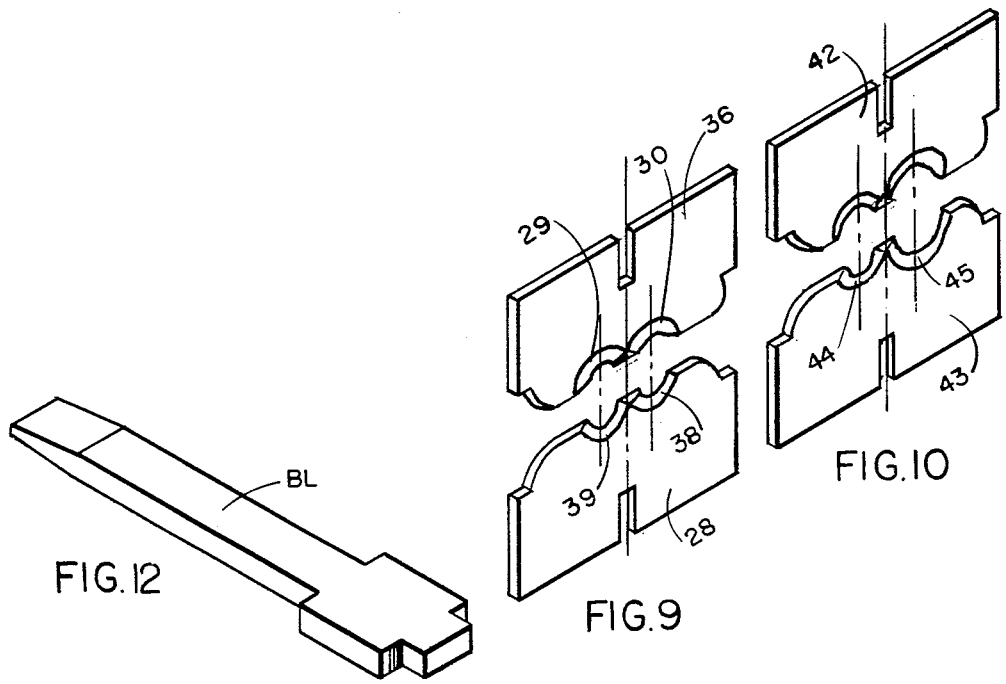
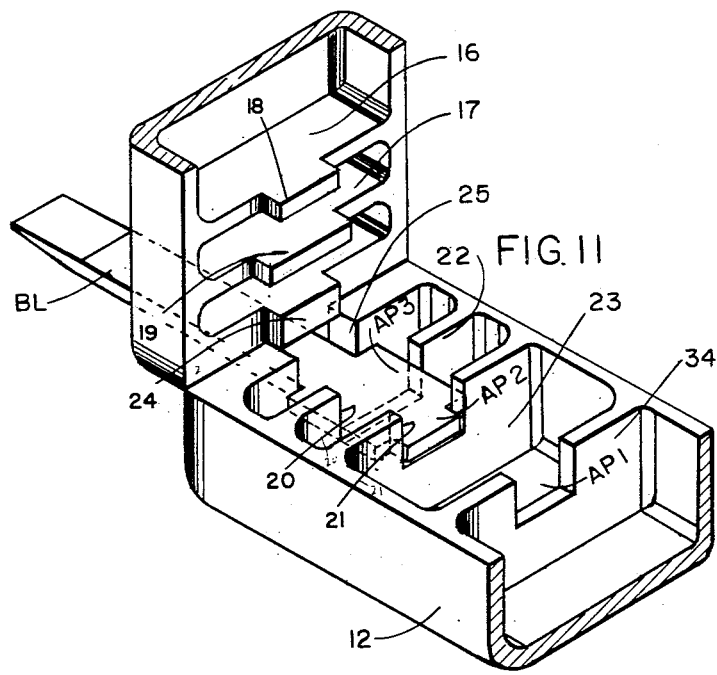

United States Patent Office 3,151,510
Patented Oct. 6, 1964

3,151,510
WIRE STRIPPER
Carleton H. Bunker, Westfield, and John J. James, Cranford, N.J., assignors to Diamond Expansion Bolt Co., Inc., Garwood, N.J., a corporation of New Jersey
Filed Feb. 8, 1963, Ser. No. 257,197
4 Claims. (Cl. 81—9.5)

This invention relates to wire stripping tools and more particularly to a wire stripping tool for parting and removing the insulated jacket from a twin conductor wire or lamp cord simultaneously in a single operation, and exposing the bare wires so that they may be readily attached to a proper electrical connection.

Wire stripping tools for use with insulated wire, which have heretofore been proposed and are available today, are designed primarily for the electrician or experienced craftsman, are intricate in structure and operation, and the cost is prohibitive for the "handy man" who only on occasion has need for a tool of this nature.

The applicants being aware of the situation regarding the availability of a tool which would be attractive and useful to the average householder, have evolved a versatile wire stripping tool which will have public appeal since due to its novel construction will be economical to manufacture. This, together with the ease of operation of our tool, assures the commercial acceptance of our tool.

One object of the present invention is the provision of a wire stripping tool for parting and removing the insulating jacket from a twin pair of conductors simultaneously in a single operation without damaging the electrical wire thereunder.

Another object of our invention is the provision of a wire stripper wherein the knife blades for circumferentially and longitudinally cutting the insulating jacket are readily removable for replacement.

A further object of the invention is the provision in a wire stripper wherein the blades, which remove the insulation from the conductors, are not exposed when the tool is in operation.

A still further object of our invention is the provision in a wire stripper whereby various sizes of wire may be stripped by changing the knife blades.

A still further object of the invention is the provision in a wire stripper whereby either single or twin wire may be stripped.

A still further object of our invention is the provision, in a wire stripper, wherein the housing or casing is (B) a single unitary structure having integral hinge means joining the two part housing.

The wire stripping tool of the present invention comprises a housing or casing composed of two similar halves elongated in configuration and having an integral hinge at one end thereof, to provide a pair of jaw-like members.

To facilitate manufacture and for ease in the operation of our tool, the lower half of the housing or casing is somewhat deeper than the top or cover. However, both are of the same general configuration and have transversely disposed, a plurality of partitions or webs. The lower half of the casing is provided with aligned notches therein to provide a longitudinally extending bore which extends the full length thereof.

The upper half of the casing is also provided with transversely extending partitions which are not notched and are in alignment with the notched partitions in the lower half of the casing. The two partitions adjacent the hinge are provided with downwardly extending lugs or bosses which engage aligned notches in the partitions in the lower half of the casing to provide securing means for the screw driver blade and to provide a barrier in the longitudinally extending bore.

Located in the upper half of the casing at the free end thereof are a pair of knives, one disposed longitudinally, and the other transversely. The longitudinal blade is triangular in configuration and is sharply pointed. The transverse blade is provided with spaced apart notches having insulation engaging sharp knife edges.

Positioned in the lower half of the casing, in alignment with the transverse blade in the upper half of the casing, is a blade having the same notched configuration. Thus when brought together these blades provide a pair of spaced apart apertures, having aligned arcuate knife edges which circumferentially cut the insulation on the conductors positioned therein. When the conductors to be stripped are positioned in the notched partitions of the lower half of the casing and the upper half thereof is closed down thereupon the knives are in juxtaposition with respect to the conductors cutting the insulation both circumferentially and longitudinally. Thus when tension is applied to the extending portion of the conductors they will be separated and the insulation stripped therefrom.

It is obvious that the length of stripping may be varied and will be governed by the amount of conductor inserted into the tool.

The invention will be more clearly understood from the following detailed description when read with reference to the drawings of which:

FIG. 3 is a top plan view of the tool of FIG. 1 in its fully opened position.

FIG. 4 is a longitudinal sectional view taken on line 4—4 of FIG. 3.

FIG. 5 is a side elevational view of the tool in its closed position.

FIG. 6 is an end elevational view of FIG. 5 looking in the direction of the arrow A.

FIG. 7 is an end elevational view looking in the direction of arrow B.

FIG. 9 is an enlarged perspective view of the circumferential knife blades showing the aligned notches.

FIG. 10 is a view similar to FIG. 9 except that the notches are each of a different size to provide two sizes of apertures.

FIGURE 11 is a fragmentary sectional view in perspective, illustrating a screw driver blade positioned in the hinged end of the tool.

FIGURE 12 is a view in perspective of the screw driver blade shown in FIGURE 11.

The reference numbers on the drawings refer to similar parts throughout.

Figure 2:
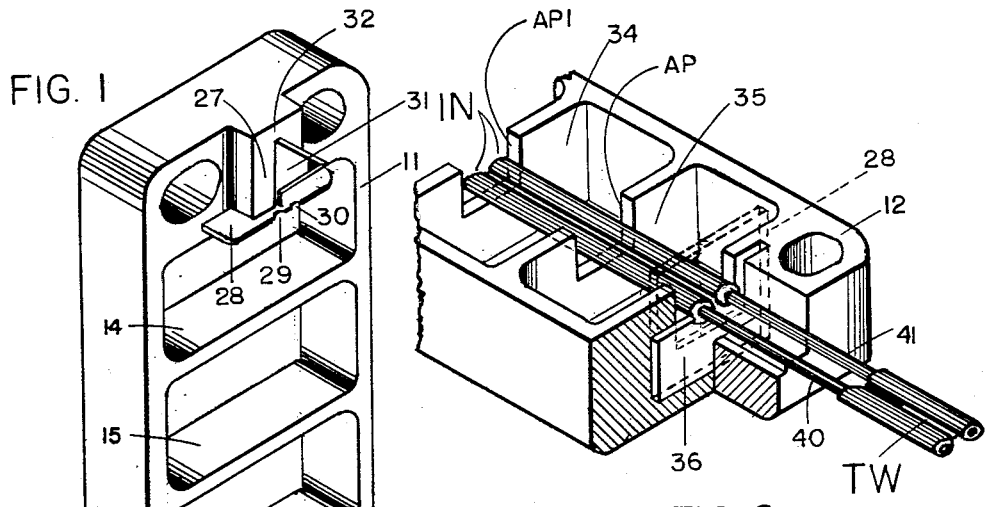
FIG. 2 is a fragmentary perspective view, partly in section showing a twin conductor positioned in the lower half of the casing with the upper knife blade in phantom.

The embodiment of our invention as shown in the various figures of the drawings, which form part of this specification, contemplates a hollow housing or casing 10 comprising two similar halves 11 and 12, hinged together at one end, by the integral hinge 13 to provide jaw-like portions as shown in FIGURES 1, 3, 4, 5, and 11.

As shown in the various figures, and with particular reference to FIGURES 1, 3, 4 and 11, the upper jaw or casing 11, while having the same general configuration as the lower member 12, is somewhat shallower and is provided with a plurality of unbroken partitions or webs, 14, 15, 16 and 17, which extend transversely with respect to the casing 11. The webs 16 and 17 are provided with lugs or bosses 18 and 19 which are arranged to register with notches 20 and 21 located in the partitions or webs 22 and 23 in the lower casing 12, to provide apertures therein, the purpose of which will be described later on in the specification. A boss 24, on the upper casing 11, adjacent the hinge 13 is arranged to engage the notch 25, to provide the aperture 26, as shown in FIGURE 7.

Figure 1:
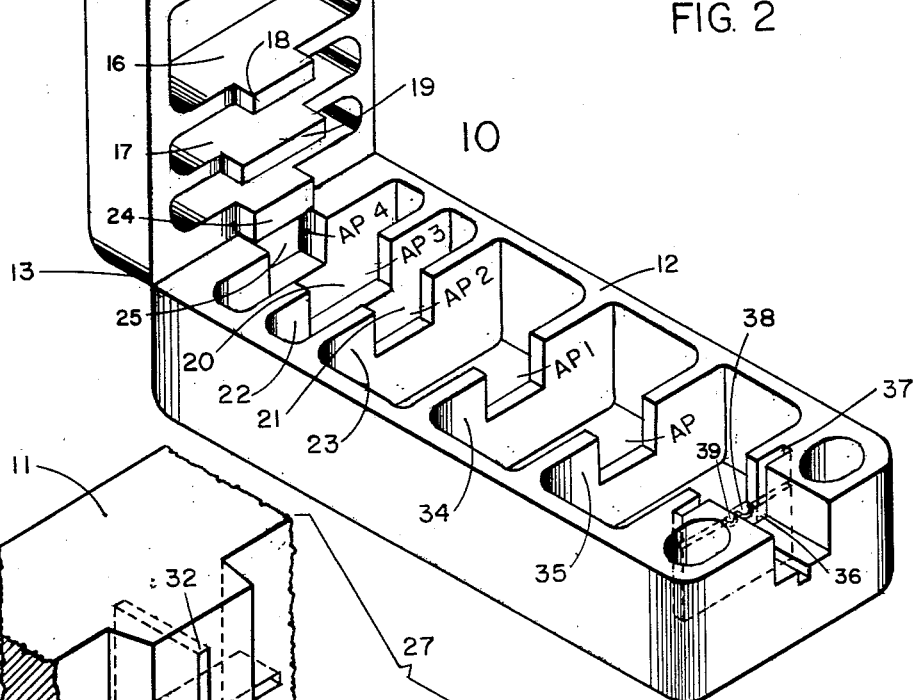
FIG. 1 is a view in perspective of the tool of this invention in its open or conductor receiving position and shows the transverse blades in the upper and lower halves of the casing and the longitudinal or slitting blade in the upper half.
Figure 8:
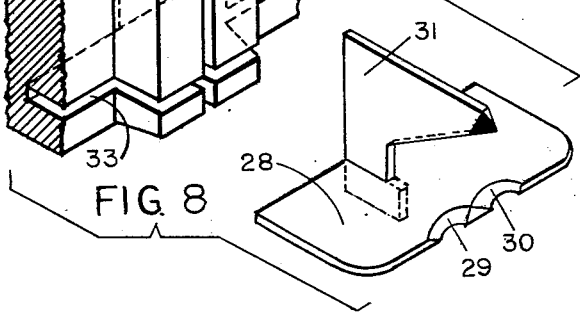
FIG. 8 is an exploded, fragmentary view in perspective of the knife blade assembly in the upper half of the casing.

As shown in FIGURE 1 and more in detail in FIGURE 8, there is positioned in the free end of the upper casing 11, a knife blade assembly 27, which comprises a notched transverse blade 28 provided with a pair of arcuate knife edged notches 29 and 30, and a longitudinally extending blade of triangular configuration 31.

The assembly 27 is removably positioned in the grooves 32 and 33, located in the upper casing 11 and may be conveniently removed for replacement or sharpening.

As illustrated in the various figures, and with particular reference to FIGURES 1 and 2, the lower jaw member of casing 12, like the upper casing 11, is also provided with transversely extending webs or partitions. These webs 22, 23, 34 and 35 align with the webs 14, 15, 16 and 17 in the upper casing 11, when the casings or jaws 11 and 12 are brought together to form a closed housing, thus providing in the lower casing 12, a plurality of longitudinally extending wire receiving aligned apertures AP, $AP^1$, $AP^2$, $AP^3$ and $AP^4$.

Located in the free end of the lower casing 12 and in alignment with the notched blade 28 in the upper casing 11, is the transversely extending blade 36. The blade 36 is removably positioned in the groove 37 and is provided with arcuate knife edged notches 38 and 39 which coincide with the notches 29 and 30 in the blade 28 when said blades are brought into juxtaposition with respect to each other as shown in FIGURE 6.

FIGURE 2 shows in phantom the blade 28, and its relative position with respect to the lower blade 36 when said blades are in closed or operative position, for example as depicted in FIGURES 5 and 6.

With the structure heretofore described, we have provided a wire stripping tool which combines in a single knife assembly means for longitudinally slitting or parting a pair of conductors and circumferentially cutting the insulation therefrom in a single operation as the twin conductors are pulled therethrough.

In the operation of the proposed tool, the casings or jaws 11 and 12 are opened as shown in FIGURE 1. The twin wires TW to be stripped, are then placed in the notches in the webs 22, 23, 34 and 35. The distance that the wire is inserted will determine the length of stripping which will be affected for example in FIGURE 2, we have shown a substantial amount of insulation IN split longitudinally and being removed from the metallic conductors 40 and 41 of the twin wire TW.

In order to enhance the value of our wire stripping tool we have incorporated therein, a screw driver blade BL as shown in FIGURES 11 and 12. The blade BL as shown is adapted to be positioned in the notches 20 and 21 in the webs 22 and 23 and in the notch 25 in the casing 12 adjacent the hinge 13. Thus providing when the casings 11 and 12 are closed a convenient handle for the operation of the blade BL.

As shown in FIGURE 9 we have shown an enlarged view of the knife blades 28 and 36.

In FIGURE 10 we have shown a modified pair of knife blades 42 and 43 wherein the notches 44 and 45 are of a different size, thereby permitting wires of single conductor type and of different sizes to be stripped.

While we have shown and described the preferred embodiment of our invention, it is obvious that various changes and modifications may be made therein and we are only limited by the scope of the appended claims.

What is claimed is:
1. A tool for stripping insulation from a pair of insulated conductors extending parallel and spaced apart at a predetermined interval with respect to one another comprising a pair of support members, a pair of knife members each mounted transversely with respect to a different one of said pair of support members, said knife members each having a cutting edge exposed with respect to the portion adjacent thereto of the surface of said respective support members upon which they are mounted, each of said cutting edges having a pair of relieved portions disposed at an interval corresponding to said predetermined interval of the conductors in order to be free of the conductors when cutting the insulation adjacent thereto, an additional knife member mounted on one of said pair of support members in a plane extending longitudinally with respect thereto and passing through the portion of said knife member mounted thereon which is disposed between said relieved portions, said additional knife member being mounted at a predetermined distance from the one of said pair of knife members mounted on said one support member and having an additional cutting edge extending beyond substantially all portions of the cutting edge of said one knife member, and means for positioning said pair of support members to bring said relieved portions of said cutting edges into register when said pair of support members are adjacent one another, whereby said additional cutting edge is adapted to begin to cut the insulation longitudinally between the conductors before said pair of knife members cut the insulation transversely with respect to the conductors.

2. A tool for stripping insulation from a pair of insulated conductors extending parallel and spaced apart at a predetermined interval with respect to one another comprising an upper support member, a lower support member, said lower support member having a slot extending longitudinally from a side portion thereof and across at least a portion of the upper surface thereof, the width of said slot substantially corresponding to the transverse dimension of the pair of insulated conductors, a first knife member mounted transversely with respect to said slot at a predetermined distance from said side portion of said lower support member, said first knife member having a first cutting edge extending across said slot beneath said upper surface of said lower support member, a second knife member mounted transversely with respect to said upper support member at a distance from an additional side portion thereof, said second knife member having a second cutting edge extending beneath the lower surface of said upper support member, each of said first and second cutting edges having a pair of relieved portions disposed at an interval corresponding to said predetermined interval of the conductors in order to be free of the conductors when cutting the insulation adjacent thereto, a third knife member mounted on said upper support member in a plane extending longitudinally with respect thereto and passing through the portion of said second knife member disposed between said relieved portions, said third knife member being mounted between said additional side portion of said second support member and said second knife member, said third knife member having a third cutting edge extending below said second cutting edge, and means for positioning said upper and lower members with respect to one another to bring said relieved portions of said first and second cutting edges into register when said upper surface of said first support member and said side portion thereof are respectively adjacent said lower surface of said second support member and said additional side portion thereof, whereby said third cutting edge is adapted to begin to cut the insulation longitudinally between the conductors before said first and second knife members cut the insulation transversely with respect to the conductors.

3. A tool for stripping insulation from a pair of insulated conductors extending parallel and spaced apart at a predetermined interval with respect to one another comprising an upper support member, a lower support member, said lower support member having a slot extending longitudinally from a side portion thereof and across at least a portion of the upper surface thereof, the width of said slot substantially corresponding to the transverse dimension of the pair of insulated conductors, said lower support member having an additional slot of predetermined thickness and predetermined length extending transversely across said slot at a predetermined distance from said side portion of said lower support member, a first knife member mounted within said additional slot, said knife member having a first cutting edge extending across said slot beneath said upper surface of said lower support member, a second knife member having a thickness and length substantially corresponding respectively to said predetermined thickness and said predetermined length, said second knife member being mounted transversely with respect to said upper support member at a distance from an additional side portion thereof and having a second cutting edge extending beneath the lower surface of said upper support member, each of said first and second cutting edges having a pair of relieved portions disposed at an interval corresponding to said predetermined interval of the conductors in order to be free of the conductors when cutting the insulation adjacent thereto, a third knife member mounted on said upper support member in a plane extending longitudinally with respect thereto and passing through the portion of said second knife member disposed between said relieved portions, said third knife member being mounted between said additional side portion of said second support member and said second knife member and having a third cutting edge extending below said second cutting edge, and means for positioning said upper and lower members with respect to one another to bring said second knife members into engagement with said additional slot and said relieved portions of said first and second cutting edges into register when said upper surface of said first support member and said side portion thereof are respectively adjacent said lower surface of said second support member and said additional side portion thereof, whereby said third cutting edge is adapted to begin to cut the insulation longitudinally between the conductors before said first and second knife members cut the insulation transversely with respect to the conductors.

4. A tool for stripping insulation from a pair of insulated conductors extending parallel and spaced apart at a predetermined interval with respect to one another comprising an upper support member, a lower support member, said lower support member having a slot extending longitudinally from a side portion thereof and across at least a portion of the upper surface thereof, the width of said slot substantially corresponding to the transverse dimension of the pair of insulated conductors, a first knife member mounted transversely with respect to said slot at a predetermined distance from said side portion of said lower support member, said first knife member having a first cutting edge extending across said slot beneath said upper surface of said lower support member, a second knife member mounted transversely with respect to said upper support member at a distance from an additional side portion thereof, said second knife member having a second cutting edge extending beneath the lower surface of said upper support member, each of said first and second cutting edges having a pair of relieved portions disposed at an interval corresponding to said predetermined interval of the conductors in order to be free of the conductors when cutting the insulation adjacent thereto, said upper support member having a projection extending between said second knife member and said additional side portion, the width of said projection transversely with respect to said second support member substantially corresponding to the width of said slot, a third knife member mounted on said upper support member in a plane extending longitudinally with respect thereto and passing through the portion of said second knife member disposed between said relieved portions, said third knife member being mounted between said additional side portion of said second support member and said second knife member and having a third cutting edge extending below said second cutting edge, and means for positioning said upper and lower members with respect to one another to bring said projection into engagement with said slot and said relieved portions of said first and second cutting edges into register when said upper surface of said first support member and said side portion thereof are respectively adjacent said lower surface of said second support member and said additional side portion thereof, whereby said third cutting edge is adapted to begin to cut the insulation longitudinally between the conductors before said first and second knife members cut the insulation transversely with respect to the conductors.

References Cited in the file of this patent

UNITED STATES PATENTS

| | | |
|---|---|---|
| 955,370 | Sullivan | Apr. 19, 1910 |
| 1,325,070 | Andrews | Dec. 16, 1919 |
| 1,939,574 | Saylor | Dec. 12, 1933 |
| 2,054,973 | Ferguson | Sept. 27, 1936 |
| 2,120,398 | Edwards et al. | June 14, 1938 |
| 2,627,768 | Cook | Feb. 10, 1953 |
| 2,697,956 | Cook | Dec. 28, 1954 |
| 2,758,490 | Williams | Aug. 14, 1956 |
| 3,002,407 | Johnson | Oct. 3, 1961 |